United States Patent Office 2,724,693
Patented Nov. 22, 1955

2,724,693

LIQUID FIRE EXTINGUISHING COMPOSITION

Charles Anthony, Jr., East Orange, and Robert Thomann, Jr., Clifton, N. J., assignors to Specialties Development Corporation, Belleville, N. J., a corporation of New Jersey No Drawing. Application December 5, 1952,
Serial No. 324,401

5 Claims. (Cl. 252—2)

The present invention relates to fire extinguishing compositions, and, more particularly, to aqueous compositions which are usable as a liquid at sub-zero temperatures.

Accordingly, an object of the invention is to provide a composition of this type which extinguishes fires rapidly and effectively.

Another object is to provide such a composition which is serviceable at about $-65°$ F. and can be readily discharged and directed on a fire at such temperature.

A further object is to provide such a fire extinguishing composition which can be stored for long periods of time without depreciation of its serviceability.

A still further object is to provide such a composition which is useful in preventing the occurrence and spreading of fires.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the invention, it has been discovered that the foregoing objects can be accomplished by providing a fire extinguishing composition consisting essentially of a water solution containing between 40% and 45% by weight zinc chloride, and between 20% and 30% by weight of ammonium sulfamate ($NH_4OSO_2 NH_2$), the solution containing between 60% and 70% by weight of these materials.

The following examples illustrate compositions according to the present invention:

*Example I*

| | Percent by weight |
|---|---|
| Zinc chloride | 40 |
| Ammonium sulfamate | 20 |
| Water | 40 |

*Example II*

| | Percent by weight |
|---|---|
| Zinc chloride | 40 |
| Ammonium sulfamate | 30 |
| Water | 30 |

*Example III*

| | Percent by weight |
|---|---|
| Zinc chloride | 45 |
| Ammonium sulfamate | 20 |
| Water | 35 |

*Example IV*

| | Percent by weight |
|---|---|
| Zinc chloride | 45 |
| Ammonium sulfamate | 25 |
| Water | 30 |

The foregoing compositions are prepared by dissolving the respective materials in fresh water at room temperature, and then filtering the solution to remove solid or undissolved impurities. Preferably, distilled water or water which has a relatively low mineral content is used.

It has been found that zinc chloride in water solution is a highly effective fire extinguishing material, particularly on Class A type fires, that is, burning wood, paper, rags, etc., in that it knocks down the flame almost instantly and prevents rekindling of the fire. The zinc chloride solution, at high concentrations, is rendered even more effective and serviceable at temperatures as low as about $-65°$ F. by the addition of ammonium sulfamate in the amounts specified.

In order to demonstrate the serviceability of these compositions at sub-zero temperatures, water-type fire extinguishers were charged with the respective compositions and were pressurized to 200 pounds per square inch with nitrogen. The extinguishers were maintained at between $-65°$ F. and $-70°$ F. for twenty-four hours, and were discharged at such temperatures. In each case, the composition was discharged as a fluid stream having a range of about thirty feet, thus demonstrating that, at such low temperatures, the usability of the compositions in connection with conventional fire extinguishing apparatus is not impaired.

Other tests were made by placing quantities of the respective compositions in open containers, and subjecting the compositions to the aforementioned temperatures for a period of about seventy-two hours. At the end of this treatment, it was found that in each case the compositions did not salt out, poured about as freely as fresh water, and did not exhibit any viscous tendencies. This accounts for the fact that rapid and efficient discharge thereof can be effected as previously mentioned.

The foregoing results could not be attained with compositions at higher or lower concentrations than those specified herein.

While the compositions in accordance with the invention are primarily intended for extinguishing Class A fires, it has been established that they also are useful to prevent the occurrence or spreading of fires. For example, in connection with craft or vehicles where a fire hazard is created upon crash or violent impact, the application of these compositions in the vicinity of a likely fire zone upon crash has prevented the incipience of fires, or has prevented the spreading of small fires which could then be easily extinguished. Thus, in addition to serving as fire extinguishing agents, the compositions also serve to prevent or confine fires.

From the foregoing description, it will be seen that the present invention provides useful and effective fire extinguishing compositions of the water solution type which are serviceable at about $-65°$ F.

It will be understood that the details and examples hereinbefore set forth are illustrative only and that the invention as broadly described and claimed is in no way limited thereby.

We claim:

1. A fire extinguishing composition serviceable at about $-65°$ F. consisting essentially of a water solution of between 40% and 45% by weight zinc chloride and between 20% and 30% by weight ammonium sulfamate, said solution containing between 60% and 70% by weight of said materials.

2. A fire extinguishing composition serviceable at about $-65°$ F. consisting essentially of a water solution of about 40% by weight of zinc chloride and about 20% by weight ammonium sulfamate.

3. A fire extinguishing composition serviceable at about $-65°$ F. consisting essentially of a water solution of about 40% by weight of zinc chloride and about 30% by weight ammonium sulfamate.

4. A fire extinguishing composition serviceable at about $-65°$ F. consisting essentially of a water solution of about 45% by weight of zinc chloride and about 20% by weight ammonium sulfamate.

5. A fire extinguishing composition serviceable at about —65° F. consisting essentially of a water solution of about 45% by weight of zinc chloride and about 25% by weight ammonium sulfamate.

References Cited in the file of this patent

UNITED STATES PATENTS 2,526,462   Edelstein _____ Oct. 17, 1950

FOREIGN PATENTS 115,998   Australia _____ Feb. 11, 1943